United States Patent [19]

Asami et al.

[11] Patent Number: 4,510,546
[45] Date of Patent: Apr. 9, 1985

[54] FLEXIBLE MAGNETIC DISC CASSETTE

[75] Inventors: Shojiro Asami, Atsugi; Kazuo Ozawa; Tetsuo Sawa, both of Tagajyo, all of Japan

[73] Assignee: Sony Corporation, Tokyo, Japan

[21] Appl. No.: 382,722

[22] Filed: May 27, 1982

[30] Foreign Application Priority Data

May 30, 1981 [JP] Japan ............................ 56-79828
Aug. 31, 1981 [JP] Japan ........................... 56-129066

[51] Int. Cl.³ .................. G11B 5/016; G11B 5/82; G11B 3/62
[52] U.S. Cl. ................................ 360/133; 360/135; 360/137
[58] Field of Search ............... 360/99, 133, 135, 137

[56] References Cited

U.S. PATENT DOCUMENTS 4,149,207 4/1979 Porter ............................. 360/133
4,175,274 11/1979 Mahn ............................... 360/99

FOREIGN PATENT DOCUMENTS 2545091 8/1976 Fed. Rep. of Germany ...... 360/133

OTHER PUBLICATIONS

IBM T/D; vol. 19, No. 12, 5-1977; "Encased Flexible Magnetic Disk with Wiper", M. Bothun.

Primary Examiner—A. J. Heinz
Attorney, Agent, or Firm—Hill, Van Santen, Steadman & Simpson

[57] ABSTRACT

A floppy disc is contained in a relatively hard encasement. In order to improve the function of a cleaning sheet installed in the floppy disc cassette encasement, a flexible pressure member is provided on an inside of the cassette which presses a portion of the cleaning sheet against the recording surface of the floppy disc.

19 Claims, 13 Drawing Figures

FLEXIBLE MAGNETIC DISC CASSETTE

BACKGROUND OF THE INVENTION

1. Field of the Invention

The present invention relates to a magnetic disc cassette apparatus wherein a flexible magnetic disc is contained in a cassette case.

2. Description of the Prior Art

As is well known, a flexible magnetic disc is usually contained in an envelope or cassette, and is called a floppy disc. The floppy disc system is frequently used as a memory system of a computer system.

If recording or reproducing of data is performed in such a magnetic disc system, dust which may invade the case will get in between the magnetic head and the magnetic disc, thereby causing a drop-out phenomenon to occur in the output signal. To prevent the occurrence of such a phenomenon, it has been proposed to provide means for removing dust from the recording/reproducing surfaces of the magnetic disc. In this case, however, an opening must be formed in the case for insertion of such dust removing means, or dust removing means must be inserted from the small aperture for insertion of the magnetic head. With this approach, however, various restrictions are encountered.

To eliminate such an inconvenience, it has been proposed to insert a non-woven sheet material into the case and allow it to sweep the recording and reproducing surface. In the case of a floppy disc cassette wherein the case is made of a soft material, the insertion of such a non-woven sheet material may have provided a sufficient sweeping effect, but in the case of a floppy disc cassette wherein the case is made of a relatively hard material, a satisfactory sweeping effect has heretofore been unattainable.

OBJECTS AND SUMMARY OF THE INVENTION

It is an object of the present invention to provide a novel magnetic disc apparatus.

It is another object of the present invention to provide a novel floppy disc cassette free from drop-out of signals.

It is a further object of the present invention to provide an improved floppy disc cassette which permits a non-woven sheet incorporated therein to fully function as a dust sweeper.

Accordingly, the present invention relates to a magnetic disc apparatus wherein a flexible magnetic disc is contained in a flat case and liner sheets are inserted between the upper surface of the magnetic disc and the case and also between the lower surface of the magnetic disc and the case, and wherein a flexible pressure member is provided within the case for pressing at least the magnetic recording surface of the magnetic disc through the liner sheets by the flexible pressure member.

The above and other objects, features and advantages of the invention will be apparent in the following detailed description of illustrative embodiments thereof which is to be read in connection with the accompanying drawings.

DETAILED DESCRIPTION OF THE EMBODIMENTS

Figure 1:
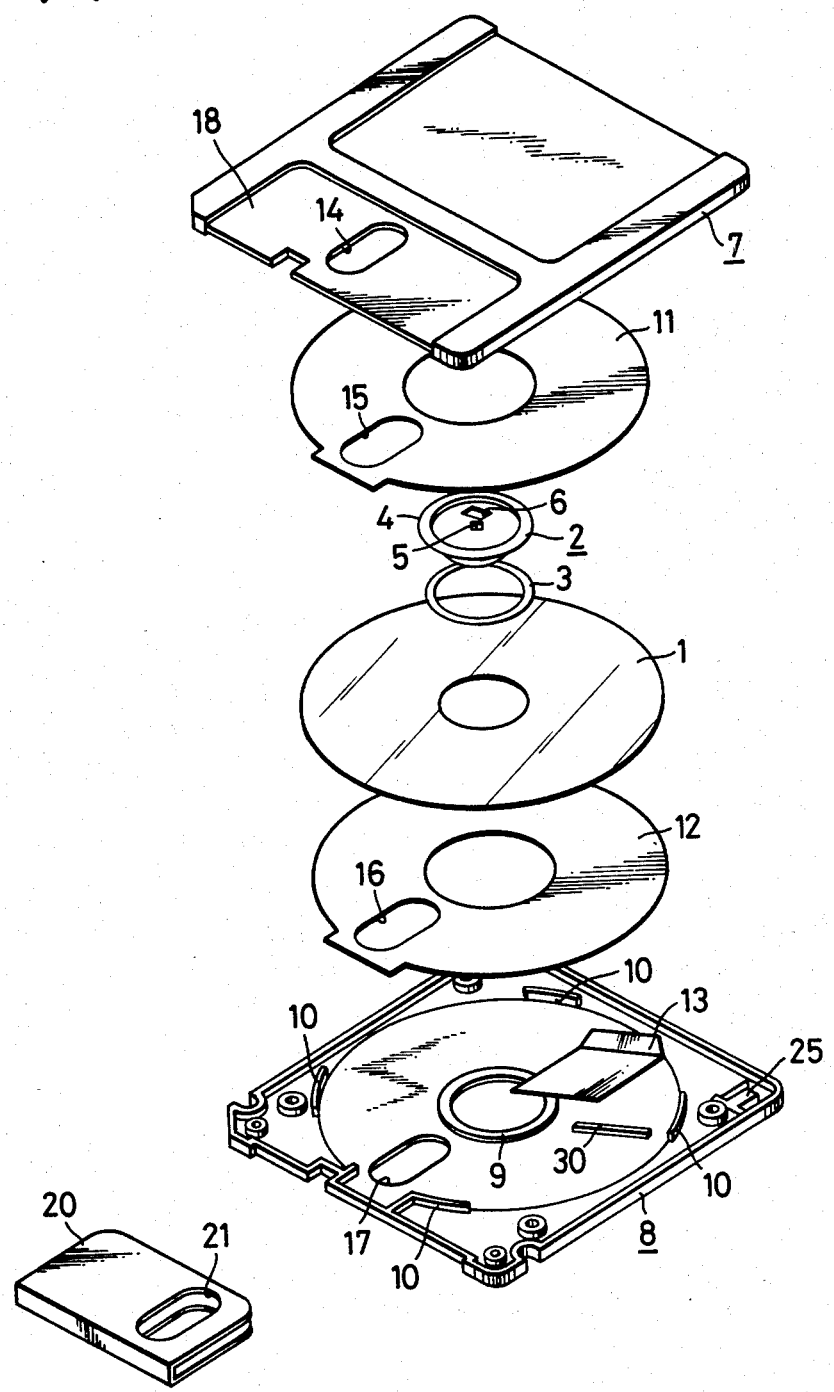
FIG. 1 is an exploded perspective view of a magnetic disc cassette according to the present invention.

Referring first to FIG. 1, there is shown in an exploded view a magnetic disc cassette system according to an embodiment of the present invention wherein reference numeral 1 designates a flexible magnetic disc consisting of a thin disc-like, polymeric film base and a magnetic layer formed uniformly on both surfaces of the film base. Numeral 2 designates a center plate fastened through a ring-like double-side adhesive tape 3 to a circular aperture formed centrally in the magnetic disc 1. The center plate 2 is pressed from a thin metallic plate and has a flange 4 to which is bonded the magnetic disc 1. A generally square-shaped, motor shaft insertion aperture 5 is formed in a central portion of the center plate 2. In a position apart by a predetermined distance from the insertion aperture 5, there is formed a rectangular, positioning pin insertion aperture 6.

The magnetic disc 1 having the center plate 2 integral therewith is contained in a case which comprises an upper shell 7 and a lower shell 8. The shells 7 and 8, for example, are injection-molded shells from an ABS resin containing an antistatic agent and are bonded together at their outer peripheral portions by means of ultrasonic welding. A circular aperture 9 is formed centrally in the lower shell 8, and the center plate 2 is fitted in the aperture 9 so that it has a slight looseness. Reference numeral 10 designates an arcuate rib, and four of such ribs 10 are disposed concentrically with respect to the aperture 9. In corresponding relation to ribs 10 there are formed arcuate ribs also on the inner surface of the upper shell 7.

Liners 11 and 12 made of a non-woven fabric such as rayon are bonded to both inner surfaces of the upper shell 7 and the lower shell 8, respectively, by means of heat welding or ultrasonic welding. The liners 11 and 12 are provided for removing dust automatically to prevent drop-out and also to prevent wear of the magnetic disc 1 and the generation of static electricity. When lining the lower shell 8 with the liner 12, a flexible member 13 made of synthetic resin is interposed therebetween for pressing the liner 12 firmly against the magnetic surface of the magnetic disc 1.

In the upper shell 7, the liners 11, 12, and the lower shell 8, there are formed radially extending longitudinal apertures 14, 15, 16 and 17, respectively, which are substantially of the same shape. In an assembled state, these longitudinal apertures are overlapped. Upon loading of the magnetic disc 1 into the system body, a magnetic head is brought into contact with the magnetic disc 1 through the longitudinal apertures 17 and 16 of the lower shell 8 and the liner 12, respectively, and at the same time a head pad is inserted through the longitudinal apertures 14 and 15 of the upper shell 7 and the liner 11, respectively.

Figure 2A:
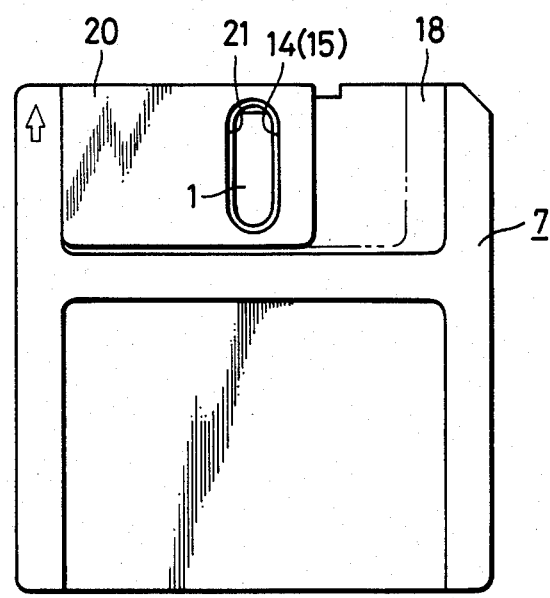
FIGS. 2A and 2B are a top view and a bottom view respectively of the magnetic disc cassette according to the present invention.
Figure 2B:
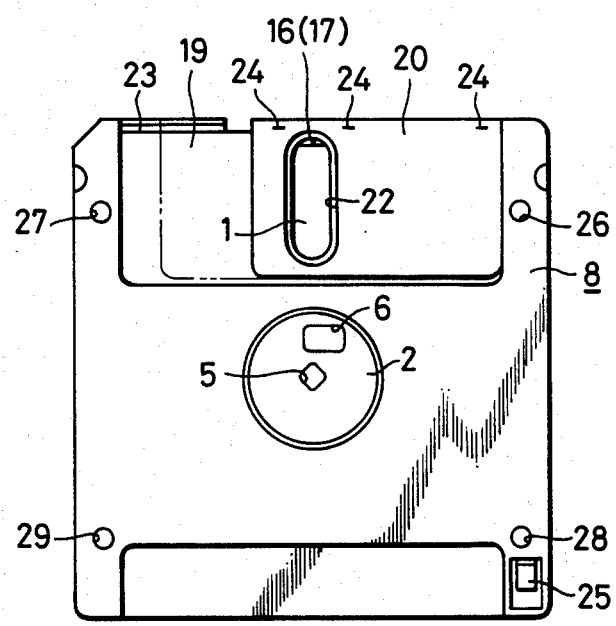

Recesses 18 and 19 are formed in the outer surfaces respectively of the upper and lower shells 7 and 8 containing the portions where the longitudinal apertures 14 and 17 are formed, and a shutter 20 made of aluminum or the like having a U-shaped section and having slits 21 and 22 of the same shape as the longitudinal apertures 14 through 17 is slidably mounted on the recesses 18 and 19. As shown in FIG. 2B, a guide groove 23 is formed along a side edge portion of the outer surface of the lower shell 8, and in corresponding relation thereto there are formed three projections 24 on the inside of the shutter 20 by means of pressing or the like. Consequently, the shutter 20 is guided by the guide groove 23 and permits the operating state to be selected wherein, as shown in solid lines in FIGS. 2A and 2B, the head inserting longitudinal apertures 16, 17, the pad inserting longitudinal apertures 14, 15, and the slits 21, 22 are coincident with one another and the magnetic disc 1 is exposed to te exterior. In the non-use state, as shown in phantom lines in the same figures, the longitudinal apertures 14 through 17 are closed and the disc 1 is covered with the shutter 20. Also, by the shutter 20, the protection of the magnetic disc 1 is attained and the entry of dust is prevented.

Furthermore, at one corner portion of the lower shell 8, a lug 25 is provided for the prevention of an accidental erasing. If the lug 25 is folded and removed, it is no longer possible to erase. At two corner portions of the lower shell 8, as shown in FIG. 2B a pair of positioning holes 26 and 27 are formed for effecting the positioning when loading the magnetic disc apparatus into the body of the disc recorder. Positions 28 and 29 shown in oblique lines in FIG. 2B at the other two corner portions of the lower shell 8 where the positioning holes 26 and 27 are not formed, serve as reference planes, and thus at the four corner portions the magnetic disc apparatus is held in a predetermined position. In this state, the magnetic disc 1 is rotated by a motor whereby the recording or reproducing of digital or analog signals is performed.

Figure 3A:
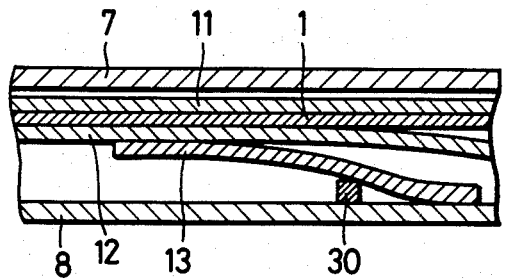
FIGS. 3A and 3B are sectional views illustrating cleaning operations by means of a flexible pressure member mounted in the magnetic disc cassette according to the present invention.

In an assembled state of the magnetic disc apparatus having the hereinabove described construction, as shown in FIG. 3A the tip end portion of the flexible member 13, by virtue of its resilience, pushes the liner 12 against the magnetic surface of the magnetic disc 1 to wipe off adhered dust or the like and thus the cleaning operation is sure to be effected to prevent the occurence of drop-out. Reference numeral 30 designates a projection formed in the mounting position of the flexible member 13 on the inner surface of the lower shell 8. The projection 30 prevents the flexible member 13 from closely adhering and sticking to the lower shell 8.

Figure 3B:
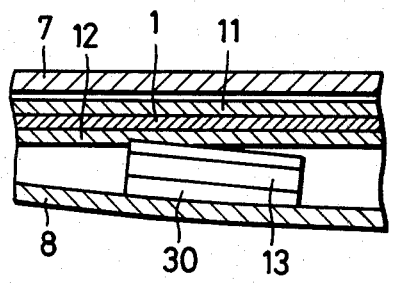

However, in case the shell has a deformation such as a warp, for example if the lower shell 8 is warped, as shown in FIG. 3B (a sectional view in the radial direction of the magnetic disc 1) the contact of the tip end portion of the flexible member 13 with the liner 12 becomes weaker at the side where the spacing between the upper and lower shells is broader, so that it is impossible to strongly push the liner 12 against the magnetic disc 1, and an insufficient cleaning sometimes results.

Figure 4:
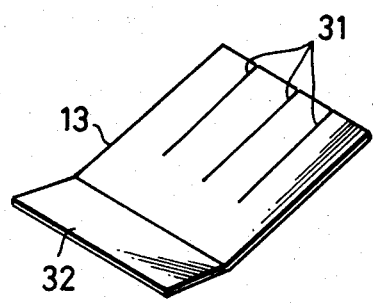
FIG. 4 is a perspective view of a flexible pressure member according to another, improved embodiment of the present invention.
Figure 5A:
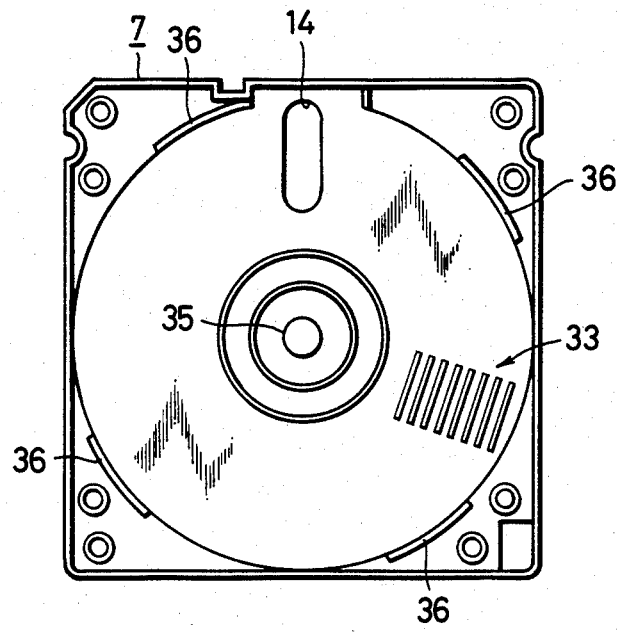
FIGS. 5A and 5B are inside views of disc cassette shells according to the present invention.
Figure 5B:
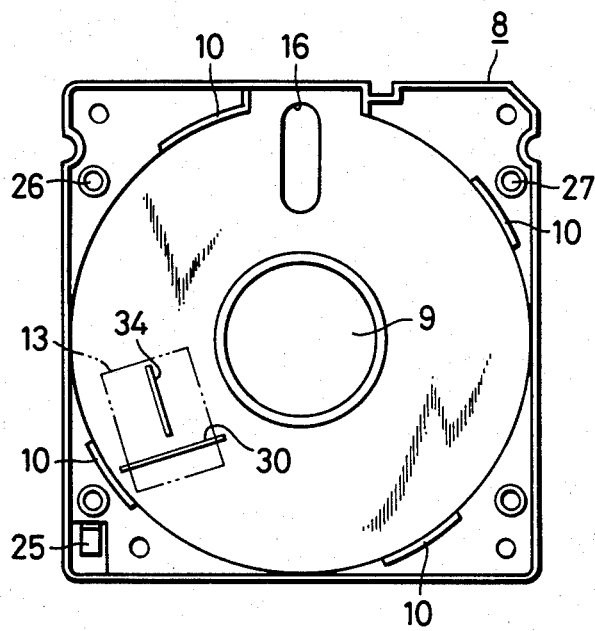

FIG. 4 shows an improved embodiment which has overcome the aforesaid problem. That is, the flexible member 13 is provided with a plurality of slits 31 extending from its tip end portion toward a base portion 32. On the other hand, as shown in FIG. 5A, a group of circumferentially extending parallel projections 33 are integrally formed on the inner surface of the upper shell 7 in the position where the tip end portion of the flexible member 13 contacts the liner 12, so that the liners 11 and 12 are maintained in close contact with both faces of the magnetic disc 1. Furthermore, as shown in FIG. 5B, on the inner surface of the lower shell 8 there are integrally formed projections 30 and 34 in the position where the flexible member 13 is mounted, whereby the flexible member 13 is prevented from sticking onto the inner surface of the lower shell 8.

In FIG. 5A, reference numeral 35 designates a wear preventing sheet attached to the position where the tip end of the motor shaft abuts, and numeral 36 designates ribs formed in surrounding relation to the loaded magnetic disc 1.

Figure 6A:
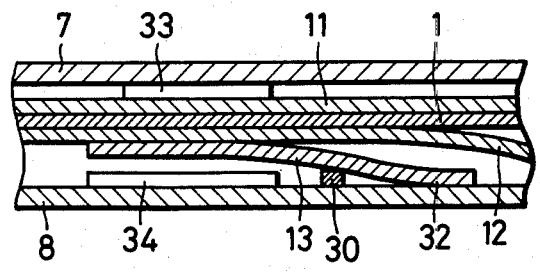
FIGS. 6A and 6B are sectional views illustrating operations of the flexible pressure member shown in FIG. 4.
Figure 6B:
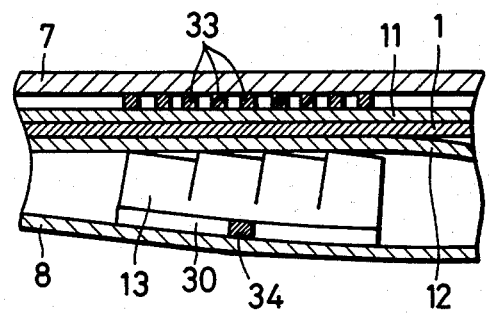

By the presence of slits 31, the tip end portion of the flexible member 13 is made movable in a twisting direction with respect to the base portion 32. Therefore, as shown in FIGS. 6A and 6B, even if the shell, for example the lower shell 8 is warped while the magnetic disc 1 is held by the upper and lower liners 11 and 12 between the upper and lower shells 7 and 8, a uniform contact at the tip end of the flexible member 13 can be realized. Therefore, even if the shell has a deformation such as a warp, all the area from the inner peripheral position up to the outer peripheral position of the magnetic surface of the magnetic disc 1 can be better cleaned such that the occurrence of dropout can be reduced.

Figure 7:
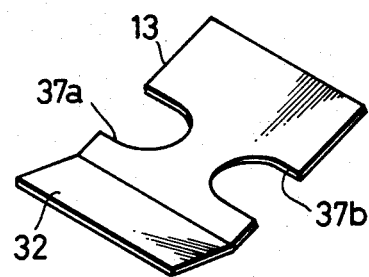
FIGS. 7 through 9 illustrate further embodiments of flexible pressure members.

FIG. 7 shows another embodiment of the flexible member 13 according to the present invention wherein a portion near the base portion 32 of the flexible member 13 is notched from both sides to form constrictions 37a and 37b. Also in this structure, the tip end portion of the flexible member 13 is movable in a twisting direction with respect to the base portion 32, thereby producing the same function and effect as mentioned above. Although not shown, moreover it may be possible to arrange a plurality of flexible members of a smaller width.

Figure 8:
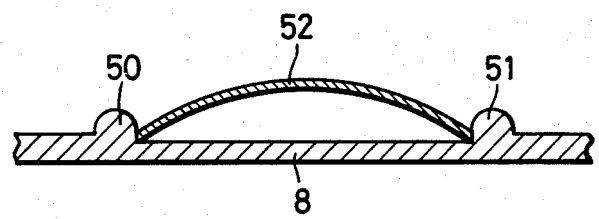
Figure 9:
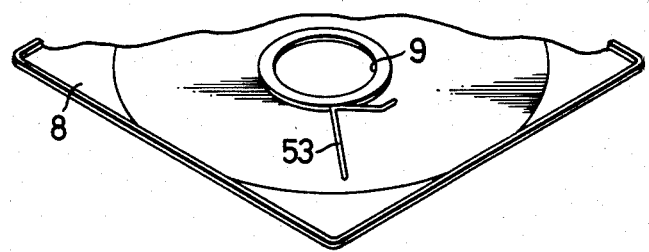

Two additional embodiments as shown in FIGS. 8 and 9 are also conceivable according to the present invention as modifications of the flexible member. For example, as shown in FIG. 8, a flexible member 52 may be mounted in a curled state to a retaining portion consisting of a pair of projections 50 and 51, allowing its central portion to press the liner 12 against the magnetic disc 1. Alternatively, as shown in FIG. 9, a structure may be such that one end of a wire spring 53 is fixed to the lower shell 8 and the wire spring 53 is bent, allowing the bent portion to press the liner 12.

In the present invention, as set forth hereinbefore, a flexible pressure means is provided within the case to press at least the magnetic surface of a magnetic disc through a liner sheet, whereby the prevention of dropout becomes possible and it is no longer necessary to provide a special drop-out preventing device on the recording/reproducing system side.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A flexible magnetic disc cassette, comprising:
a flexible magnetic disc,
a cover means having an upper and lower half for containing said flexible magnetic disc,
a cleaning sheet having dimensions similar to the disc interposed as a liner between said lower half of the cover and said flexible magnetic disc so as to line an inside of the cover with respect to a surface of said disc, and
a flexible pressure means separate from the liner provided on an inner surface of said lower half for pressing a portion of said cleaning sheet against said flexible magnetic disc.

2. A flexible magnetic disc cassette of claim 1 wherein said flexible pressure means comprises a wire spring extended along a radial direction of said flexible magnetic disc.

3. A flexible magnetic disc cassette of claim 1 wherein said flexible pressure means comprises a synthetic resin sheet.

4. A flexible magnetic disc cassette of claim 3 wherein said synthetic resin sheet is secured on said lower half of the case as to form an inverted U-shaped pressure means.

5. A flexible magnetic disc cassette of claim 3 wherein one end of said resin sheet is secured on said lower half of the case and the other end thereof is depressed against said cleaning sheet.

6. A flexible magnetic disc cassette of claim 5 wherein the other end of said resin sheet has at least one slit means for approximately averaging a pressure across a recording surface of said disc.

7. A flexible magnetic disc cassette of claim 5 wherein said resin sheet has a cut out means at both sides for providing flexibility in a radial direction of said disc in order to average a pressure along a recording surface of said disc.

8. A flexible magnetic disc cassette, comprising: a flexible magnetic disc; a cover means for containing said flexible magnetic disc; a cleaning sheet interposed as a liner between an inner surface of the cover and a recording surface of the disc; a flexible pressure means separate from the cleaning sheet provided at said inner surface for depressing a portion of said cleaning sheet against the recording surface of the magnetic disc; and the cleaning sheet comprising a substantially circular disc having a diameter approximately the same as the magnetic disc.

9. A cassette according to claim 8 wherein a second cleaning sheet formed as a substantially circular disc having a diameter approximately the same as the magnetic disc is provided at an opposite side of the disc from the first cleaning sheet as a liner between the disc and an opposite inner surface of the cover.

10. A cassette according to claim 8 wherein the cover means has an aperture means at said inner surface through which a magnetic head may contact the recording surface of the disc and wherein said cleaning sheet also has an aperture in alignment with the aperture and the inner surface.

11. A cassette according to claim 8 wherein the magnetic disc has a central aperture therein in alignment with a central aperture provided in the cleaning sheet, said cleaning sheet having a substantially circular configuration.

12. A flexible magnetic disc cassette, comprising:
a flexible magnetic disc;
cover means having an upper and lower half containing said flexible magnetic disc;
a cleaning sheet interposed between said lower half of the cover and said flexible magnetic disc, said cleaning sheet having a first portion attached to an inner surface of the lower half of the cover and a second portion separated from and unattached to the lower half inner surface of the cover;
a flexible pressure means separate from the cleaning sheet having one portion attached to said inner surface of the lower half and another portion biased away from the inner surface for pressing said second portion of said cleaning sheet against said flexible magnetic disc; and
the cleaning sheet comprising a circular liner of dimensions similar to the disc so as to provide a lining between the lower half inner surface of the cover and substantially all surface portions of the disc, the liner having a central aperture therein permitting access to the disc for driving thereof.

13. A flexible magnetic disc cassette, comprising: a flexible magnetic disc; a cover means having first and second major inside surfaces for containing said flexible magnetic disc; a cleaning sheet directly attached to one of said surfaces between said surface and said flexible magnetic disc and having dimensions similar to the disc so as to be a liner between said one surface and the disc; and a flexible pressure means separate from the cleaning sheet attached to said inner surface to which the cleaning sheet is attached and positioned so as to press a portion of the cleaning sheet not attached to said surface against the flexible magnetic disc.

14. A flexible magnetic disc cassette, comprising: a flexible magnetic disc; a cover means having first and second major inside surfaces facing the disc for containing said flexible magnetic disc; a cleaning sheet having dimensions similar to the disc directly attached at one portion thereof to one of said major inside surfaces between said one major inside surface and said flexible magnetic disc, another portion of the cleaning sheet being unattached; a flexible pressure means separate from the cleaning sheet attached to said one major inside surface to which the cleaning sheet is attached and positioned so as to press the cleaning sheet against the flexible magnetic disc; said pressure means comprising a sheet secured at one end and its other opposite end being a tip end depressed against said cleaning sheet; and projection means lying between said unattached portion of said cleaning sheet and said one major inside surface to which the cleaning sheet is attached and also substantially between the pressure means sheet and said one major inside surface so as to serve as a stop for preventing a portion of the pressure means from deflecting into contact with said one major inside surface at the location of said projection means and also for insuring that the flexible pressure means sheet tip end presses against the cleaning sheet to press the cleaning sheet against the disc.

15. A cassette according to claim 14 wherein said projection means comprises a rib.

16. A cassette according to claim 14 wherein the major inside surface opposite said one major inside surface having the projection means also has a projection means for maintaining contact of another cleaning sheet with an opposite surface of the disc.

17. A flexible magnetic disc cassette, comprising:
a flexible magnetic disc;

a cover means for surrounding and enclosing the flexible magnetic disc;

first and second substantially circular cleaning sheets having dimensions corresponding to the disc and positioned at opposite major surfaces thereof so as to provide a lining between each of the disc surfaces and a respective upper and lower inner surface of the cover means;

the first and second cleaning sheets being attached to the respective lower and upper surfaces; and a flexible pressure means between the first cleaning sheet and the lower surface, said flexible pressure means being separate from the first cleaning sheet and for pressing a portion of the first cleaning sheet not attached to the lower surface against the flexible magnetic disc surface.

18. A disc cassette according to claim 17 wherein the flexible pressure means comprises a member having an angular bend between first and second portions, the first portion being attached to the lower surface of the cover, the second portion projecting upwardly against the first cleaning sheet, and a projection being provided between the second portion and the lower inner surface of the cover.

19. A disc cassette according to claim 18 wherein projections are provided on the upper surface substantially opposite the projection on the lower inner surface of the cover.

* * * * *